United States Patent [19]

Matsumoto et al.

[11] Patent Number: 4,897,374
[45] Date of Patent: Jan. 30, 1990

[54] DIELECTRIC CERAMIC AND PROCESS OF PREPARING IT

[75] Inventors: Kazutoshi Matsumoto, Matsudo; Ko Takada; Takehiro Hiuga, both of Ichikawa; Tetsuya Mukai, Matsudo, all of Japan

[73] Assignee: Sumitomo Metal Mining Co., Ltd., Tokyo, Japan

[21] Appl. No.: 284,695

[22] Filed: Dec. 15, 1988

[30] Foreign Application Priority Data

Dec. 16, 1987 [JP] Japan .................................. 62-319961
Jun. 17, 1988 [JP] Japan .................................. 63-149859

[51] Int. Cl.$^4$ ............................................ C04B 35/00
[52] U.S. Cl. .................................... 501/134; 501/135; 501/151
[58] Field of Search ......................... 501/134, 135, 151

[56] References Cited

U.S. PATENT DOCUMENTS 4,585,745 4/1986 Tunooka et al. .................... 501/135
4,716,134 12/1987 Yamaguchi et al. ................ 501/135

FOREIGN PATENT DOCUMENTS 0252668 1/1988 European Pat. Off. .
51-016500 2/1976 Japan .................................. 252/62.9
56-140074 11/1981 Japan .................................. 252/62.9
61-018101 1/1986 Japan .................................. 501/135

Primary Examiner—Mark L. Bell
Assistant Examiner—Anthony J. Green
Attorney, Agent, or Firm—Oblon, Spivak, McClelland, Maier & Neustadt

[57] ABSTRACT

A dielectric ceramic having the composition represented by the general formula (I):

$$Ba_xA_yB_{1-x-y}F_zO_w$$

wherein A is at least one selected from the group consisting of Mg, Zn, Ni and Co; B is at least one selected from Ta and Nb; x, y, and z are numbers represented by $0.48 \leq x \leq 0.52$, $0.15 \leq y \leq 0.19$ and $0.00025 \leq z \leq 0.05$, respectively; and w is a number such that the total electric charges of cations of A and B and anions of F are neutralized to make the ceramic substantially neutral as a whole, and a process of preparing the dielectric ceramic. This ceramic has a high dielectric constant and unloaded Q and has a small temperature coefficient of resonance frequency.

9 Claims, No Drawings

DIELECTRIC CERAMIC AND PROCESS OF PREPARING IT

BACKGROUND OF THE INVENTION

1. Field of the Invention

This invention relates to a dielectric ceramic and a process of preparing it, and is more particularly concerned with a dielectric ceramic having high dielectric constant and high unloaded Q, and a process of preparing the same.

2. Description of Prior Art

In general, dielectric ceramics having high dielectric constant and high unloaded Q, and yet having a small absolute value for the temperature coefficient of resonance frequency, are desired to be used in dielectric resonators or dielectric substrates used in signal circuits in the region of high frequencies such as microwaves and millimeter waves. $TiO_2$ materials have hitherto been widely used as the dielectric ceramics of this type, as exemplified by $BaO$—$TiO_2$ or $ZrO_2$—$SnO_2$—$TiO_2$ materials, and $Ba(Zn,Ta)O_3$ or $Ba(Mg,Ta)O_3$ materials have been recently used. The dielectric ceramics comprised of these mateials have characteristics such that at a high frequency of about 10 GHz the unloaded Q ranges from 3,000 to 7,000, the dielectric constant ranges from 20 to 40 and the temperature characteristic of resonance frequency is considerably so small as to be nearly 0 ppm/°C.

These dielectric ceramics have been prepared by making a powdery raw material mixture which is uniform in the composition according to a coprecipitation method, a multi-stage wet method or the like, calcining, grinding and thereafter pressure-molding the powdery raw material mixture, followed by firing of the resulting pressure-molded product over a long period of time, e.g., 140 hours.

The above conventional preparation process requires a number of progressive steps and also requires the strict controlling of preparation conditions. Hence, process management is complicated, and also there is a problem in mass production.

SUMMARY OF THE INVENTION

Now, an object of this invention is to provide a dielectric ceramic having high unloaded Q and high dielectric constant, and yet capable of being prepared with ease and suitable for mass production, and a process for preparing the same.

To achieve the above object, this invention provides a dielectric ceramic having the composition represented by the general formula (I):

$$Ba_xA_yB_{1-x-y}F_zO_w \qquad (I)$$

wherein A is at least one selected from the group consisting of Mg, Zn, Ni and Co; B is at least one selected from the group consisting of Ta and Nb; x, y, and z are numbers in the ranges represented by $0.48 \leq x \leq 0.52$, $0.15 \leq y \leq 0.19$ and $0.00025 \leq z \leq 0.05$, respectively; and w is a number such that the total electric charges of cations of A and B and anions of F are neutralized to make the ceramic substantially neutral as a whole.

The dielectric ceramics of this invention have a high dielectric constant and unloaded Q at a high frequency region, and a small temperature coefficient of resonance frequency, thus satisfying the performances required as dielectrics for use at a high frequency. In particular, the unloaded Q can exceed 36,000 depending on the composition, thus enabling utilization at a high frequency region of, for example, 22 GHz or 50 GHz. The present dielectric ceramics can also be readily prepared without use of the conventional complicated processes, so that they can be easy in quality management and suited to mass production, also bringing about great economical advantages owing to the reduction of cost.

DETAILED DESCRIPTION OF PREFERRED EMBODIMENTS OF THE INVENTION

In the above general formula (I), the x and y representing the proportion of the respective cations and the z representing the proportion of fluorine are important particularly to obtain dielectric ceramics having a high unloaded Q at a high frequency region as aimed for one thing in this invention, and their respective ranges are so limited that the aim can be achieved. The x, y and z range are described above, i.e., $0.48 \leq x \leq 0.52$, $0.15 \leq y \leq 0.19$ and $0.00025 \leq z \leq 0.05$, and preferably, $0.49 \leq x \leq 0.51$, $0.15 \leq y \leq 0.18$ and $0.0005 \leq z \leq 0.01$, respectively. If any one of x, y and z deviates from the above ranges, sintering can be carried out with insufficiency, resulting in incapableness of obtaining high unloaded Q or a lowering of mechanical strength and specific dielectric constant. In particular, z which is less than 0.00025 makes it difficult to carry out sintering, resulting in a lowering of the mechanical strength and unloaded Q of the resulting dielectric ceramics. Also, z which is more than 0.05 may cause a lowering of the unloaded Q of the resulting dielectric ceramics.

The A in the above general formula (I) representing the dielectric ceramics of this invention is at least one selected from the group consisting of Ma, Zn, Ni and Co, and comprises any of these elements singly or in combination of two or more ones.

Preferred embodiments of the dielectric ceramics of this invention will now be described.

In the first embodiment of the dielectric ceramic according this invention, the A in said general formula (I) consists of at least one selected from the group consisting of Mg and Zn and at least one selected from the group consisting of Ni and Co, each of Ni and Co being contained in a proportion of not more than 40 mol % in the A. This embodiment is a preferred one, because a high unloaded Q can be obtained.

The above first embodiment of the ceramic includes a more specific embodiment in which Ni and Co in total are contained in a proportion of not more than 40% in the A.

In the second embodiment of the dielectric ceramic of this invention, the A in said general formula (I) consists of Mg and at least one selected from the group consisting of Ni and Co, Ni and Co in total being contained in a proportion of not more than 40% in the A.

In the third embodiment of the ceramic of this invention, the A in the general formula (I) consists of Zn and at least one selected from the group consisting of Ni and Co, Ni and Co in total being contained in a proportion of not more than 70 mol % in the A. In the case where Mg is not contained, this third embodiment is a preferred one in view of unloaded Q and dielectric constant obtained.

In the fourth embodiment of the ceramic of the invention, the A in the general formula (I) consists of Zn, and the B in the general formula (I) consists of Ta and Ni.

In the most preferred embodiment of the ceramic of this invention, the A in said general formula (I) is Mg, and the B in the general formula (I) is Ta. More specifically, this embodiment is one in which the dielectric ceramic comprises the combination of elements, represented by the following general formula (II):

$$Ba_xMg_yTa_{1-x-y}F_zO_w \qquad (II)$$

wherein x, y, z and w are the same as defined in the above general formula (I). The dielectric ceramics of this embodiment have a particularly high dielectric constant and unloaded Q. Even those having an unloaded Q of more than 36,000 can be obtained, which can be utilized at a high frequency region of 22 GHz or 50 GHz, for instance.

The w in the above general formula (I), representing the proportion of oxygen, is a number by which the total electric charge of the electric charges of the above respective cations and the electric charge of anions of F are neutralized to make the dielectric ceramic substantially neutral as a whole.

The dielectric ceramics of this invention can be prepared, for example, by a process comprising the steps of calcining, grinding and thereafter pressure-molding a powdery raw material containing;
(a) Ba;
(b) at least one selected from the group consisting of Mg, Zn, Ni and Co;
(c) at least one selected from Ta and Nb; and
(d) F;
followed by firing the resulting pressure-molded product.

The powdery raw material used in the above process can usually be prepared from plural raw materials each containing one or more required elements.

The raw material containing barium used in preparing the dielectric ceramics of this invention may include powder of barium carbonate and barium fluoride.

The raw material containing magnesium may include, for example, magnesium oxide and magnesium fluoride. The raw material containing zinc may include, for example, zinc oxide and zinc fluoride. The raw material containing nickel may include, for example, nickel oxide and nickel fluoride. The raw material containing cobalt may include cobalt oxide and cobalt fluoride. The raw material containing tantalum may include, for example, oxides such as tantalum pentaoxide, fluorides such as tantalum fluoride, and oxyfluorides such as $TaOF_3$ and $TaO_2F$. The raw material containing niobium may include, for example, niobium pentaoxide and niobium fluoride, or oxyfluorides such as $NbO_2F$. It is also possible to use double fluorides containing two or more of these elements used. For example, double fluorides containing barium and magnesium may include $Ba_2MgF_6$. Double fluorides containing barium and zinc may include $BaZnF_4$ and $Ba_2ZnF_6$. Double fluorides containing barium and nickel may include $Ba_2NiF_6$ and $BaNiF_4$. Double fluorides containing barium and cobalt may include $Ba_2CoF_6$ and $BaCoF_4$. Where a fluoride or the like is used as a raw material, the fluorine contained is introduced into the dielectric ceramics of this invention to constitute the F in the general formula (I).

Using as raw materials the above fluoride of barium, magnesium or tantalum or the above double fluorides makes it hard for impurities of metal elements to be mixed from the raw material into the dielectric ceramics, and hence is preferable from the view point of the manufacture. Other materials containing fluorine include, for example, potassium fluoride, sodium fluoride and lithium fluoride.

In the above process, necessary raw material powders are mixed in the proportion that can give the dielectric ceramics of this invention having the desired composition represented by the above general formula (I), and the resulting mixtures is then calcined and ground according to a conventional method, followed by pressure molding. There are no particular limitations on the pressure molding method, but a method in which isotactic pressure is applied is preferred.

The above pressure-molded product is then subjected to firing. This firing is carried out usually at a temperature of from 1,400° to 1,650° C. An excessively low temperature for this firing may result in insufficient sintering, and a low mechanical strength of the resulting dielectric ceramics, as well as a low unloaded Q. An excessively high firing temperature may cause unnecessary volatilization of the ceramic-constituting components, or, when the holding vessel used comprises a vessel made of platinum, widely used in firing steps because of its high-temperature stability, may sometimes cause reaction of dielectric ceramics with the vessel, resulting in a lowering of the characteristics of the resulting dielectric ceramics. In this firing step, the time required for firing may range usually from about 30 minutes to 4 hours.

Also, this firing step is carried out usually in an inert atmosphere such as nitrogen or argon, or in an oxidizing atmosphere such as oxygen or air.

In the above calcining and firing steps, it may occur that part of fluorine in the raw materials is volatilized by heating. Hence, the amount of fluorine in the raw materials must be determined in anticipation of the amount of the fluorine to be volatilized by heating. As methods of suppressing this volatilization, however, there may be used, for example, a method in which a raw material mixture is enveloped by a fire resistant materials such as MgO, $Ta_2O_5$, $ZrO_2$ or $Al_2O_3$, or a method in which powder of $BaF_2$, $MgF_2$, $CaF_2$ or the like is placed in a hermetically closed, fire resistant vessel for carrying out the calcination and firing, or the calcination and firing of raw materials are carried out using a vessel comprised of fluorides such as fluorite. This suppressing of the volatilization of fluorine is effective particularly when dielectric ceramics containing fluorine in an amount near to the lower limit in general formula (I) (z=0.00025) are prepared.

EXAMPLES

This invention will be described below in detail by giving Examples of the invention and Comparative Examples.

Examples 1 to 12, Comparative Examples 1 to 5

Powders of barium carbonate, magnesium oxide, tantalum oxide, barium fluoride and magnesium fluoride each having a purity of 99.9% by weight were made ready for use as raw materials, and these raw material powders were so weighed and blended as to give raw material blends having 17 kinds of compositions, respectively, as shown in Table 1. The blends were each put in a ball mill pot together with pure water, and wet mixed for 16 hours using resin-coated balls.

The resulting mixture was taken out of the pot, and dried at 150° C. for 3 hours, followed by calcination at 1,000° C. for 2 hours in oxygen. After the calcination, the calcined prroduct was ground into particles, which were then passed through a sieve of 42 meshes to make the particlesize uniform. The resulting powder was primarily molded into a disc of 10 mm in diameter and about 5 mm in thickness under a pressure of 500 kg/cm² using a mold, followed by compression under a pressure of 2,000 kg/cm² by means of a hydrostatic press to give a pressure-molded product. This molded product was heated up to 1,600° C. at a rate of 5° C./min in oxygen and then fired at 1,600° C. for 2 hours in oxygen, thereby obtaining a dielectric ceramic.

The content of fluorine, the specific dielectric constant ($\epsilon_r$) and unloaded Q ($Q_u$) at 10 GHz according to Dielectric Rod Resonance Method, and the temperature coefficient ($\tau_f$) of resonance frequency were measured on the resulting dielectric ceramics. Results obtained are shown in Table 1.

tion from barium carbonate, magnesium oxide, zinc oxide, nickel oxide, cobalt oxide, tantalum oxide, niobium oxide, barium fluoride and magnesium fluoride each having a purity of 99.9% by weight. These respective raw material powders were so weighed and blended that the compositional ratio of each element might be Ba:A(Mg,Zn,Ni,Co):B(Ta,Nb)=3/6(x):1/6(y):2/6(1-x-y) and the proportion of Mg, Zn, Ni and Co in element A and proportion of Ta and Nb in element B might be as shown in Table 2, to make raw material mixtures. The resulting raw material mixtures were processed in the same manner as in Example 1 to prepare dielectric ceramics, and the specific dielectric constant ($\epsilon_r$), unloaded Q ($Q_u$), temperature coefficient ($\tau_f$) of resonance frequency, and content of fluorine in ceramics were measured on the resulting dielectric ceramics.

TABLE 1

| | Composition of materials | | | | F content | | | Dielectric ceramics Temperature coefficient of resonance frequency |
|---|---|---|---|---|---|---|---|---|
| | Ba (x) | Mg (y) | Ta | F (wt.) | (z) | $\epsilon_r$ | $Q_u$* | ppm/°C. |
| Example | | | | | | | | |
| 1 | 0.49 | 0.17 | 0.34 | 5,000 ppm | 0.001 | 24.4 | 35,100 | 4.7 |
| 2 | 0.51 | 0.16 | 0.33 | 5,000 ppm | 0.001 | 24.3 | 32,000 | 4.2 |
| 3 | 0.51 | 0.15 | 0.34 | 5,000 ppm | 0.001 | 24.5 | 32,000 | 4.5 |
| 4 | 0.51 | 0.18 | 0.31 | 5,000 ppm | 0.001 | 24.0 | 34,700 | 3.0 |
| 5 | 0.51 | 0.17 | 0.32 | 5,000 ppm | 0.001 | 24.2 | 31,000 | 3.6 |
| 6 | 0.51 | 0.16 | 0.33 | 5,000 ppm | 0.001 | 25.1 | 30,600 | 3.8 |
| 7 | 0.50 | 0.17 | 0.33 | 5,000 ppm | 0.001 | 24.5 | 34,000 | 4.2 |
| 8 | 0.50 | 0.17 | 0.33 | 100 ppm | 0.00025 | 24.0 | 29,000 | 3.9 |
| 9 | 0.50 | 0.17 | 0.33 | 200 ppm | 0.00025 | 24.3 | 35,200 | 3.9 |
| 10 | 0.50 | 0.17 | 0.33 | 2% | 0.0005 | 24.6 | 36,200 | 4.0 |
| 11 | 0.50 | 0.17 | 0.33 | 10% | 0.002 | 24.6 | 33,300 | 4.4 |
| 12 | 0.50 | 0.17 | 0.33 | 20% | 0.005 | 24.6 | 31,900 | 4.2 |
| Comparative Example | | | | | | | | |
| 1 | 0.47 | 0.17 | 0.36 | 5,000 ppm | 0.001 | 25.3 | 14,900 | 6.1 |
| 2 | 0.53 | 0.14 | 0.33 | 5,000 ppm | 0.001 | 24.0 | 22,000 | 4.0 |
| 3 | 0.50 | 0.2. | 0.30 | 5,000 ppm | 0.001 | 22.3 | 9,500 | 4.7 |
| 4** | 0.50 | 0.17 | 0.33 | — | <0.00025 | 18.9 | 2,900 | 4.1 |
| 5 | 0.50 | 0.17 | 0.33 | 30% | >0.05 | 24.6 | 24,800 | 4.2 |

*Measured value for $Q_u$ is a value at 10 GHz.
**Comparative Example 4 is an example in which barium carbonate, magnesium oxide and tantalum oxide only were used and no fluoride was used.

Examples 13 to 105, Comparative Examples 6 to 12

In each Example and Comparative Example, necessary powders were made ready for use by making selec- Results obtained are shown in Table 2.

TABLE 2

| | Composition of materials | | | | | | | | | | Dielectric ceramics | |
|---|---|---|---|---|---|---|---|---|---|---|---|---|
| | A | | | | B | | F (wt.) | | F content (z) | $\epsilon_r$ | $Q_u$ | Temperature coefficient of resonance frequency (ppm/°C.) |
| | Mg | Zn | Ni | Co | Ta | Nb | | | | | | |
| Example: | | | | | | | | | | | | |
| 13 | 1.0 | 0 | 0 | 0 | 0.75 | 0.25 | 5,000 | ppm | 0.001 | 26.0 | 19,000 | 11.3 |
| 14 | 0.75 | 0.25 | 0 | 0 | 0.75 | 0.25 | 5,000 | ppm | 0.001 | 27.9 | 16,900 | 10.0 |
| 15 | 0.75 | 0.25 | 0 | 0 | 1.0 | 0 | 5,000 | ppm | 0.001 | 25.1 | 24,200 | 3.1 |
| 16 | 0.5 | 0.5 | 0 | 0 | 0.75 | 0.25 | 5,000 | ppm | 0.001 | 28.8 | 18,000 | 9.3 |
| 17 | 0.5 | 0.5 | 0 | 0 | 1.0 | 0 | 5,000 | ppm | 0.002 | 25.9 | 22,000 | 1.3 |
| 18 | 0.25 | 0.75 | 0 | 0 | 0.75 | 0.25 | 5,000 | ppm | 0.002 | 29.9 | 15,100 | 6.9 |
| 19 | 0.25 | 0.75 | 0 | 0 | 1.0 | 0 | 5,000 | ppm | 0.001 | 27.8 | 20,000 | 0.7 |
| 20 | 0 | 1.0 | 0 | 0 | 0.5 | 0.5 | 5,000 | ppm | 0.002 | 34.9 | 11,700 | 12.5 |
| 21 | 0 | 1.0 | 0 | 0 | 0.75 | 0.25 | 5,000 | ppm | 0.001 | 32.0 | 12,300 | 6.6 |
| 22 | 0.8 | 0 | 0.2 | 0 | 0.5 | 0.5 | 5,000 | ppm | 0.001 | 28.0 | 13,900 | 12.7 |
| 23 | 0.8 | 0 | 0.2 | 0 | 0.75 | 0.25 | 5,000 | ppm | 0.001 | 26.3 | 17,700 | 5.6 |
| 24 | 0.8 | 0 | 0.2 | 0 | 1.0 | 0 | 1,000 | ppm | 0.001 | 23.6 | 20,800 | −0.3 |
| 25 | 0.55 | 0.25 | 0.2 | 0 | 0.5 | 0.5 | 1,000 | ppm | 0.001 | 29.8 | 12,000 | 11.5 |
| 26 | 0.55 | 0.25 | 0.2 | 0 | 0.75 | 0.25 | 1,000 | ppm | 0.001 | 28.0 | 16,000 | 4.6 |

TABLE 2-continued

| | Composition of materials | | | | | | | | Dielectric ceramics | | |
|---|---|---|---|---|---|---|---|---|---|---|---|
| | A | | | | B | | | F content | | | Temperature coefficient of resonance frequency |
| | Mg | Zn | Ni | Co | Ta | Nb | F (wt.) | (z) | $\epsilon_r$ | $Q_u$ | (ppm/°C.) |
| 27 | 0.55 | 0.25 | 0.2 | 0 | 1.0 | 0 | 1,000 ppm | 0.001 | 25.3 | 18,500 | −1.0 |
| 28 | 0.3 | 0.5 | 0.2 | 0 | 0.5 | 0.5 | 1,000 ppm | 0.001 | 31.9 | 9,600 | 9.9 |
| 29 | 0.3 | 0.5 | 0.2 | 0 | 0.75 | 0.25 | 1,000 ppm | 0.001 | 29.0 | 14,000 | 3.5 |
| 30 | 0.3 | 0.5 | 0.2 | 0 | 1.0 | 0 | 1,000 ppm | 0.001 | 26.0 | 14,000 | −2.1 |
| 31 | 0.05 | 0.75 | 0.2 | 0 | 0.5 | 0.5 | 1,000 ppm | 0.001 | 33.3 | 8,500 | 9.0 |
| 32 | 0.05 | 0.75 | 0.2 | 0 | 0.75 | 0.25 | 1,000 ppm | 0.001 | 30.0 | 11,000 | 1.1 |
| 33 | 0.05 | 0.75 | 0.2 | 0 | 1.0 | 0 | 1,000 ppm | 0.001 | 27.8 | 15,100 | −3.5 |
| 34 | 0.6 | 0 | 0.4 | 0 | 0.5 | 0.5 | 1,000 ppm | 0.0005 | 28.1 | 10,000 | 7.0 |
| 35 | 0.6 | 0 | 0.4 | 0 | 0.75 | 0.25 | 1,000 ppm | 0.001 | 25.5 | 13,000 | 1.4 |
| 36 | 0.6 | 0 | 0.4 | 0 | 1.0 | 0 | 1,000 ppm | 0.001 | 23.8 | 15,700 | −3.6 |
| 37 | 0.35 | 0.25 | 0.4 | 0 | 0.5 | 0.5 | 1,000 ppm | 0.001 | 29.7 | 8,000 | 7.7 |
| 38 | 0.35 | 0.25 | 0.4 | 0 | 0.75 | 0.25 | 1,000 ppm | 0.001 | 28.0 | 9,500 | 0.9 |
| 39 | 0.35 | 0.25 | 0.4 | 0 | 1.0 | 0 | 1,000 ppm | 0.0005 | 25.0 | 13,600 | −6.0 |
| 40 | 0.1 | 0.5 | 0.4 | 0 | 0.25 | 0.75 | 1,000 ppm | 0.001 | 34.8 | 7,700 | 10.8 |
| 41 | 0.1 | 0.5 | 0.4 | 0 | 0.5 | 0.5 | 1,000 ppm | 0.001 | 32.2 | 7,800 | 6.0 |
| 42 | 0.1 | 0.5 | 0.4 | 0 | 0.75 | 0.25 | 1,000 ppm | 0.001 | 28.9 | 8,000 | 0.3 |
| 43 | 0.1 | 0.5 | 0.4 | 0 | 1.0 | 0 | 1,000 ppm | 0.001 | 26.5 | 12,000 | −6.0 |
| 44 | 0.8 | 0 | 0 | 0.2 | 0.5 | 0.5 | 1,000 ppm | 0.001 | 27.9 | 10,900 | 12.1 |
| 45 | 0.8 | 0 | 0 | 0.2 | 0.75 | 0.25 | 1,000 ppm | 0.001 | 26.0 | 17,000 | 5.0 |
| 46 | 0.8 | 0 | 0 | 0.2 | 1.0 | 0 | 1,000 ppm | 0.001 | 24.0 | 22,200 | 0.0 |
| 47 | 0.55 | 0.25 | 0 | 0.2 | 0.5 | 0.5 | 10,000 ppm | 0.002 | 30.3 | 11,700 | 8.8 |
| 48 | 0.55 | 0.25 | 0 | 0.2 | 0.75 | 0.25 | 10,000 ppm | 0.002 | 27.7 | 15,000 | 2.4 |
| 49 | 0.55 | 0.25 | 0 | 0.2 | 1.0 | 0 | 10,000 ppm | 0.002 | 25.3 | 19,000 | −1.8 |
| 50 | 0.3 | 0.5 | 0 | 0.2 | 0.5 | 0.5 | 10,000 ppm | 0.002 | 31.0 | 9,900 | 9.8 |
| 51 | 0.3 | 0.5 | 0 | 0.2 | 0.75 | 0.25 | 10,000 ppm | 0.002 | 29.0 | 11,000 | 2.2 |
| 52 | 0.3 | 0.5 | 0 | 0.2 | 1.0 | 0 | 10,000 ppm | 0.001 | 25.9 | 14,900 | −2.0 |
| 53 | 0.05 | 0.75 | 0 | 0.2 | 0.75 | 0.25 | 10,000 ppm | 0.002 | 29.9 | 10,000 | 0.9 |
| 54 | 0.05 | 0.75 | 0 | 0.2 | 1.0 | 0 | 10,000 ppm | 0.001 | 27.7 | 15,300 | −3.0 |
| 55 | 0.6 | 0 | 0.2 | 0.2 | 0.5 | 0.5 | 10,000 ppm | 0.002 | 27.0 | 8,800 | 7.0 |
| 56 | 0.6 | 0 | 0.2 | 0.2 | 0.75 | 0.25 | 10,000 ppm | 0.001 | 25.5 | 12,900 | −0.9 |
| 57 | 0.6 | 0 | 0.2 | 0.2 | 1.0 | 0 | 10,000 ppm | 0.001 | 24.2 | 17,300 | −3.8 |
| 58 | 0.35 | 0.25 | 0.2 | 0.2 | 0.5 | 0.5 | 200 ppm | 0.0005 | 29.5 | 7,000 | 3.8 |
| 59 | 0.35 | 0.25 | 0.2 | 0.2 | 0.75 | 0.25 | 200 ppm | 0.0005 | 27.9 | 8,500 | 0.8 |
| 60 | 0.35 | 0.25 | 0.2 | 0.2 | 1.0 | 0 | 200 ppm | 0.0005 | 25.0 | 13,000 | −4.4 |
| 61 | 0.1 | 0.5 | 0.2 | 0.2 | 0.25 | 0.75 | 200 ppm | 0.0005 | 34.0 | 8,000 | 9.0 |
| 62 | 0.1 | 0.5 | 0.2 | 0.2 | 0.5 | 0.5 | 200 ppm | 0.00025 | 30.1 | 8,500 | 3.9 |
| 63 | 0.1 | 0.5 | 0.2 | 0.2 | 0.75 | 0.25 | 200 ppm | 0.00025 | 29.5 | 10,000 | −1.5 |
| 64 | 0.1 | 0.5 | 0.2 | 0.2 | 1.0 | 0 | 200 ppm | 0.0005 | 25.9 | 13,300 | −4.0 |
| 65 | 0.4 | 0 | 0.4 | 0.2 | 0 | 1.0 | 200 ppm | 0.00025 | 32.2 | 7,000 | 11.1 |
| 66 | 0.4 | 0 | 0.4 | 0.2 | 0.25 | 0.75 | 200 ppm | 0.00025 | 30.9 | 7,500 | 10.0 |
| 67 | 0.4 | 0 | 0.4 | 0.2 | 0.5 | 0.5 | 200 ppm | 0.0005 | 27.7 | 7,300 | 5.6 |
| 68 | 0.4 | 0 | 0.4 | 0.2 | 0.75 | 0.25 | 200 ppm | 0.0005 | 25.5 | 9,000 | 0.1 |
| 69 | 0.4 | 0 | 0.4 | 0.2 | 1.0 | 0 | 200 ppm | 0.00025 | 23.9 | 13,000 | −5.6 |
| 70 | 0.15 | 0.25 | 0.4 | 0.2 | 0.25 | 0.75 | 100 ppm | 0.00025 | 32.3 | 7,100 | 6.0 |
| 71 | 0.15 | 0.25 | 0.4 | 0.2 | 0.5 | 0.5 | 100 ppm | 0.00025 | 29.5 | 7,900 | −0.3 |
| 72 | 0.15 | 0.25 | 0.4 | 0.2 | 0.75 | 0.25 | 100 ppm | 0.00025 | 26.9 | 7,900 | −3.3 |
| 73 | 0.15 | 0.25 | 0.4 | 0.2 | 1.0 | 0 | 100 ppm | 0.00025 | 25.0 | 10,300 | −7.5 |
| 74 | 0.6 | 0 | 0 | 0.4 | 0.25 | 0.75 | 100 ppm | 0.00025 | 28.8 | 7,500 | 9.9 |
| 75 | 0.6 | 0 | 0 | 0.4 | 0.5 | 0.5 | 100 ppm | 0.00025 | 27.1 | 8,000 | 5.0 |
| 76 | 0.6 | 0 | 0 | 0.4 | 0.75 | 0.25 | 100 ppm | 0.00025 | 25.5 | 9,300 | −1.0 |
| 77 | 0.6 | 0 | 0 | 0.4 | 1.0 | 0 | 100 ppm | 0.00025 | 24.1 | 13,400 | −3.1 |
| 78 | 0.35 | 0.25 | 0 | 0.4 | 0.25 | 0.75 | 100 ppm | 0.0005 | 30.0 | 10,300 | 9.0 |
| 79 | 0.35 | 0.25 | 0 | 0.4 | 0.5 | 0.5 | 100 ppm | 0.0005 | 30.1 | 8,600 | 6.0 |
| 80 | 0.35 | 0.25 | 0 | 0.4 | 0.75 | 0.25 | 100 ppm | 0.00025 | 28.0 | 9,000 | 2.1 |
| 81 | 0.35 | 0.25 | 0 | 0.4 | 1.0 | 0 | 100 ppm | 0.00025 | 25.5 | 14,000 | −2.9 |
| 82 | 0.1 | 0.5 | 0 | 0.4 | 0 | 1.0 | 100 ppm | 0.00025 | 36.1 | 7,000 | 12.9 |
| 83 | 0.1 | 0.5 | 0 | 0.4 | 0.25 | 0.75 | 100 ppm | 0.0005 | 33.1 | 7,000 | 9.0 |
| 84 | 0.1 | 0.5 | 0 | 0.4 | 0.5 | 0.5 | 100 ppm | 0.00025 | 31.0 | 7,500 | 5.5 |
| 85 | 0.1 | 0.5 | 0 | 0.4 | 0.75 | 0.25 | 100 ppm | 0.0005 | 27.9 | 7,300 | 0.6 |
| 86 | 0.1 | 0.5 | 0 | 0.4 | 1.0 | 0 | 100 ppm | 0.0005 | 26.0 | 7,800 | −4.4 |
| 87 | 0.4 | 0 | 0.2 | 0.4 | 0 | 1.0 | 100 ppm | 0.0005 | 32.0 | 7,000 | 11.6 |
| 88 | 0.4 | 0 | 0.2 | 0.4 | 0.25 | 0.75 | 100 ppm | 0.00025 | 29.6 | 7,100 | 9.1 |
| 89 | 0.4 | 0 | 0.2 | 0.4 | 0.5 | 0.5 | 100 ppm | 0.00025 | 27.7 | 7,100 | 3.3 |
| 90 | 0.4 | 0 | 0.2 | 0.4 | 0.75 | 0.25 | 100 ppm | 0.0005 | 26.1 | 9,000 | 0.2 |
| 91 | 0.4 | 0 | 0.2 | 0.4 | 1.0 | 0 | 100 ppm | 0.00025 | 24.4 | 9,900 | −5.9 |
| 92 | 0.15 | 0.25 | 0.2 | 0.4 | 0 | 1.0 | 100 ppm | 0.00025 | 34.4 | 7,200 | 10.0 |
| 93 | 0.15 | 0.25 | 0.2 | 0.4 | 0.25 | 0.75 | 100 ppm | 0.00025 | 31.0 | 8,000 | 5.9 |
| 94 | 0.15 | 0.25 | 0.2 | 0.4 | 0.5 | 0.5 | 100 ppm | 0.00025 | 29.3 | 7,400 | 2.0 |
| 95 | 0.15 | 0.25 | 0.2 | 0.4 | 0.75 | 0.25 | 100 ppm | 0.0005 | 28.3 | 8,200 | −3.7 |
| 96 | 0.15 | 0.25 | 0.2 | 0.4 | 1.0 | 0 | 100 ppm | 0.00025 | 25.5 | 9,600 | −7.0 |
| 97 | 0.2 | 0 | 0.4 | 0.4 | 0 | 1.0 | 100 ppm | 0.0005 | 31.0 | 7,100 | 4.0 |
| 98 | 0.2 | 0 | 0.4 | 0.4 | 0.25 | 0.75 | 100 ppm | 0.0005 | 30.1 | 7,000 | −0.2 |
| 99 | 0.2 | 0 | 0.4 | 0.4 | 0.5 | 0.5 | 100 ppm | 0.0005 | 28.0 | 7,000 | −3.1 |
| 100 | 0.2 | 0 | 0.4 | 0.4 | 0.75 | 0.25 | 100 ppm | 0.00025 | 26.3 | 7,200 | −8.1 |
| 101 | 0.2 | 0 | 0.4 | 0.4 | 1.0 | 0 | 100 ppm | 0.00025 | 24.0 | 8,500 | −9.0 |

TABLE 2-continued

| | Composition of materials | | | | | | | Dielectric ceramics | | | |
|---|---|---|---|---|---|---|---|---|---|---|---|
| | A | | | | B | | | F content | | | Temperature coefficient of resonance frequency |
| | Mg | Zn | Ni | Co | Ta | Nb | F (wt.) | (z) | $\epsilon_r$ | $Q_u$ | (ppm/°C.) |
| 102 | 0 | 0.5 | 0.5 | 0 | 0.4 | 0.6 | 100 ppm | 0.00025 | 29.1 | 7,200 | −2.7 |
| 103 | 0 | 0.3 | 0.7 | 0 | 0.3 | 0.7 | 100 ppm | 0.00025 | 28.1 | 7,000 | −7.9 |
| 104 | 0 | 0.8 | 0.1 | 0.1 | 0.7 | 0.3 | 5,000 ppm | 0.001 | 31.0 | 15,500 | 2.6 |
| 105 | 0 | 0.6 | 0.2 | 0.2 | 0.6 | 0.4 | 5,000 ppm | 0.001 | 30.6 | 14,000 | −0.4 |
| Comparative Example: | | | | | | | | | | | |
| 6 | 0.5 | 0.5 | 0 | 0 | 1.0 | 0 | — | <0.00025 | 22.2 | 3,100 | 0.9 |
| 7 | 0.8 | 0 | 0.2 | 0 | 1.0 | 0 | — | <0.00025 | 19.9 | 2,700 | 0.1 |
| 8 | 0.8 | 0 | 0 | 0.2 | 0.5 | 0.5 | — | <0.00025 | 25.5 | 5,000 | 13.0 |
| 9 | 0.1 | 0.5 | 0.2 | 0.2 | 1.0 | 0 | — | <0.00025 | 24.0 | 6,100 | −4.3 |
| 10 | 0.2 | 0 | 0.4 | 0.4 | 0.25 | 0.75 | — | <0.00025 | 23.0 | 2,100 | 0.8 |
| 11 | 0.2 | 0 | 0.4 | 0.4 | 1.0 | 0 | — | <0.00025 | 16.3 | 3,600 | −8.8 |
| 12 | 1.0 | 0 | 0 | 0 | 0.75 | 0.25 | 25% | >0.05 | 26.2 | 6,000 | 9.4 |

Examples 106 to 147, Comparative Examples 13 to 54

In each Example and Comparative Example, necessary powders were made ready for use by making selection from barium carbonate, magnesium oxide, zinc oxide, nickel oxide, cobalt oxide, tantalum oxide, niobium oxide, barium fluoride, magnesium fluoride, zinc fluoride, nickel fluoride and cobalt fluoride each having a purity of 99.9% by weight. These respective raw material powders were so weighed and blended that the compositional ratio of each element may be as shown in Table 3, to make raw material mixtures. Comparative Examples 14, 20, 26, 32, 38, 44 and 50 are examples in which no fluoride is used as a raw material.

The resulting raw material mixtures were processed in the same manner as in Example 1 to prepare dielectric ceramics, and the specific dielectric constant ($\epsilon_r$), unloaded Q ($Q_u$), temperature coefficient ($\tau_f$) of resonance frequency, and content of fluorine in ceramics were measured on the resulting dielectric ceramics.

Results obtained are shown in Table 3.

TABLE 3

| | Composition of materials | | | | | | | | | Dielectric ceramics | | |
|---|---|---|---|---|---|---|---|---|---|---|---|---|
| | Ba | A(y) | | | | B | | | | F content | | |
| | (x) | Mg | Zn | Ni | Co | Ta | Nb | F (wt.) | (z) | $\epsilon_r$ | $Q_u$ | |
| Example: | | | | | | | | | | | | |
| 106 | 0.52 | 0.15 | — | — | — | — | 0.33 | 0.5% | 0.001 | 27.7 | 6,500 | |
| 107 | 0.52 | 0.19 | — | — | — | — | 0.29 | 0.5% | 0.001 | 25.0 | 8,100 | |
| 108 | 0.51 | 0.18 | — | — | — | — | 0.31 | 0.5% | 0.001 | 28.1 | 9,300 | |
| 109 | 0.49 | 0.17 | — | — | — | — | 0.34 | 0.5% | 0.001 | 33.2 | 10,900 | |
| 110 | 0.48 | 0.15 | — | — | — | — | 0.37 | 0.1% | 0.0025 | 37.0 | 7,200 | |
| 111 | 0.48 | 0.19 | — | — | — | — | 0.33 | 10% | 0.001 | 34.3 | 8,600 | |
| 112 | 0.52 | — | 0.15 | — | — | 0.33 | — | 0.5% | 0.001 | 24.7 | 6,900 | |
| 113 | 0.52 | — | 0.19 | — | — | 0.29 | — | 0.5% | 0.001 | 23.8 | 7,700 | |
| 114 | 0.51 | — | 0.18 | — | — | 0.31 | — | 0.5% | 0.001 | 26.2 | 13,800 | |
| 115 | 0.49 | — | 0.17 | — | — | 0.34 | — | 0.5% | 0.001 | 30.6 | 19,000 | |
| 116 | 0.48 | — | 0.15 | — | — | 0.37 | — | 0.1% | 0.0025 | 33.2 | 7,000 | |
| 117 | 0.48 | — | 0.19 | — | — | 0.33 | — | 10% | 0.001 | 32.3 | 8,900 | |
| 118 | 0.52 | — | 0.15 | — | — | — | 0.33 | 0.5% | 0.001 | 35.6 | 6,100 | |
| 119 | 0.52 | — | 0.19 | — | — | — | 0.29 | 0.5% | 0.001 | 33.3 | 7,800 | |
| 120 | 0.51 | — | 0.18 | — | — | — | 0.31 | 0.5% | 0.001 | 36.4 | 8,600 | |
| 121 | 0.49 | — | 0.17 | — | — | — | 0.34 | 0.5% | 0.001 | 41.8 | 9,100 | |
| 122 | 0.48 | — | 0.15 | — | — | — | 0.37 | 0.1% | 0.0025 | 45.4 | 6,900 | |
| 123 | 0.48 | — | 0.19 | — | — | — | 0.33 | 10% | 0.001 | 43.2 | 8,000 | |
| 124 | 0.52 | — | — | 0.15 | — | 0.33 | — | 0.5% | 0.001 | 20.3 | 6,000 | |
| 125 | 0.52 | — | — | 0.19 | — | 0.29 | — | 0.5% | 0.001 | 18.1 | 7,500 | |
| 126 | 0.51 | — | — | 0.18 | — | 0.31 | — | 0.5% | 0.001 | 20.8 | 7,600 | |
| 127 | 0.49 | — | — | 0.17 | — | 0.34 | — | 0.5% | 0.001 | 25.5 | 9,000 | |
| 128 | 0.48 | — | — | 0.15 | — | 0.37 | — | 0.1% | 0.0025 | 28.7 | 6,900 | |
| 129 | 0.48 | — | — | 0.19 | — | 0.33 | — | 10% | 0.001 | 26.6 | 8,100 | |
| 130 | 0.52 | — | — | 0.15 | — | — | 0.33 | 0.5% | 0.001 | 31.1 | 6,100 | |
| 131 | 0.52 | — | — | 0.19 | — | — | 0.29 | 0.5% | 0.001 | 27.7 | 6,300 | |
| 132 | 0.51 | — | — | 0.18 | — | — | 0.31 | 0.5% | 0.001 | 31.0 | 6,800 | |
| 133 | 0.49 | — | — | 0.17 | — | — | 0.34 | 0.5% | 0.001 | 36.7 | 7,200 | |
| 134 | 0.48 | — | — | 0.15 | — | — | 0.37 | 0.1% | 0.0025 | 40.9 | 6,000 | |
| 135 | 0.48 | — | — | 0.19 | — | — | 0.33 | 10% | 0.001 | 37.5 | 7,000 | |
| 136 | 0.52 | — | — | — | 0.15 | 0.33 | — | 0.5% | 0.001 | 21.5 | 6,100 | |
| 137 | 0.52 | — | — | — | 0.19 | 0.29 | — | 0.5% | 0.001 | 19.6 | 6,100 | |
| 138 | 0.51 | — | — | — | 0.18 | 0.31 | — | 0.5% | 0.001 | 22.2 | 6,500 | |
| 139 | 0.49 | — | — | — | 0.17 | 0.34 | — | 0.5% | 0.001 | 26.9 | 6,700 | |
| 140 | 0.48 | — | — | — | 0.15 | 0.37 | — | 0.1% | 0.0025 | 29.9 | 6,000 | |
| 141 | 0.48 | — | — | — | 0.19 | 0.33 | — | 10% | 0.001 | 28.1 | 6,300 | |
| 142 | 0.52 | — | — | — | 0.15 | — | 0.33 | 0.5% | 0.001 | 26.7 | 6,000 | |
| 143 | 0.52 | — | — | — | 0.19 | — | 0.29 | 0.5% | 0.001 | 24.3 | 6,100 | |
| 144 | 0.51 | — | — | — | 0.18 | — | 0.31 | 0.5% | 0.001 | 27.2 | 6,000 | |

TABLE 3-continued

| | Composition of materials | | | | | | | Dielectric ceramics | | |
|---|---|---|---|---|---|---|---|---|---|---|
| | Ba | A(y) | | | | B | | F content | | |
| | (x) | Mg | Zn | Ni | Co | Ta | Nb | F (wt.) | (z) | $\epsilon_r$ | $Q_u$ |
| 145 | 0.49 | — | — | — | 0.17 | — | 0.34 | 0.5% | 0.001 | 32.5 | 6,200 |
| 146 | 0.48 | — | — | — | 0.15 | — | 0.37 | 0.1% | 0.0025 | 35.8 | 6,100 |
| 147 | 0.48 | — | — | — | 0.19 | — | 0.33 | 10% | 0.001 | 33.4 | 6,000 |
| Comparative Example: | | | | | | | | | | | |
| 13 | 0.51 | 0.18 | — | — | — | — | 0.31 | 30% | >0.05 | 28.1 | 4,300 |
| 14 | 0.49 | 0.17 | — | — | — | — | 0.34 | — | <0.00025 | Poor Sinter | |
| 15 | 0.54 | 0.13 | — | — | — | — | 0.33 | 0.5% | 0.001 | 24.5 | 4,100 |
| 16 | 0.53 | 0.20 | — | — | — | — | 0.27 | 0.5% | 0.001 | 22.1 | 5,100 |
| 17 | 0.46 | 0.16 | — | — | — | — | 0.38 | 0.5% | 0.001 | 41.0 | 3,700 |
| 18 | 0.49 | 0.21 | — | — | — | — | 0.30 | 0.5% | 0.001 | 30.7 | 5,400 |
| 19 | 0.51 | — | 0.18 | — | — | 0.31 | — | 30% | >0.05 | 26.2 | 4,400 |
| 20 | 0.49 | — | 0.17 | — | — | 0.34 | — | — | <0.00025 | Poor Sinter | |
| 21 | 0.54 | — | 0.13 | — | — | 0.33 | — | 0.5% | 0.001 | 21.0 | 4,300 |
| 22 | 0.53 | — | 0.20 | — | — | 0.27 | — | 0.5% | 0.001 | 21.4 | 5,500 |
| 23 | 0.46 | — | 0.16 | — | — | 0.38 | — | 0.5% | 0.001 | 37.2 | 4,100 |
| 24 | 0.49 | — | 0.21 | — | — | 0.30 | — | 0.5% | 0.001 | 29.7 | 5,600 |
| 25 | 0.51 | — | 0.18 | — | — | — | 0.31 | 30% | >0.05 | 36.4 | 3,800 |
| 26 | 0.49 | — | 0.17 | — | — | — | 0.34 | — | <0.00025 | Poor Sinter | |
| 27 | 0.54 | — | 0.13 | — | — | — | 0.33 | 0.5% | 0.001 | 31.9 | 4,000 |
| 28 | 0.53 | — | 0.20 | — | — | — | 0.27 | 0.5% | 0.001 | 30.3 | 4,900 |
| 29 | 0.46 | — | 0.16 | — | — | — | 0.38 | 0.5% | 0.001 | 49.7 | 3,500 |
| 30 | 0.49 | — | 0.21 | — | — | — | 0.30 | 0.5% | 0.001 | 39.6 | 4,800 |
| 31 | 0.51 | — | — | 0.18 | — | 0.31 | — | 30% | >0.05 | 20.8 | 3,100 |
| 32 | 0.49 | — | — | 0.17 | — | 0.34 | — | — | <0.00025 | Poor Sinter | |
| 33 | 0.54 | — | — | 0.13 | — | 0.33 | — | 0.5% | 0.001 | 17.1 | 3,600 |
| 34 | 0.53 | — | — | 0.20 | — | 0.27 | — | 0.5% | 0.001 | 15.5 | 4,500 |
| 35 | 0.46 | — | — | 0.16 | — | 0.38 | — | 0.5% | 0.001 | 32.4 | 3,300 |
| 36 | 0.49 | — | — | 0.21 | — | 0.30 | — | 0.5% | 0.001 | 23.4 | 5,000 |
| 37 | 0.51 | — | — | 0.18 | — | — | 0.31 | 30% | >0.05 | 31.0 | 2,900 |
| 38 | 0.49 | — | — | 0.17 | — | — | 0.34 | — | <0.00025 | Poor Sinter | |
| 39 | 0.54 | — | — | 0.13 | — | — | 0.33 | 0.5% | 0.001 | 28.0 | 2,600 |
| 40 | 0.53 | — | — | 0.20 | — | — | 0.27 | 0.5% | 0.001 | 24.4 | 3,200 |
| 41 | 0.46 | — | — | 0.16 | — | — | 0.38 | 0.5% | 0.001 | 44.9 | 2,100 |
| 42 | 0.49 | — | — | 0.21 | — | — | 0.30 | 0.5% | 0.001 | 33.3 | 4,000 |
| 43 | 0.51 | — | — | — | 0.18 | 0.31 | — | 30% | >0.05 | 22.2 | 2,300 |
| 44 | 0.49 | — | — | — | 0.17 | 0.34 | — | — | <0.00025 | Poor Sinter | |
| 45 | 0.54 | — | — | — | 0.13 | 0.33 | — | 0.5% | 0.001 | 18.1 | 2,600 |
| 46 | 0.53 | — | — | — | 0.20 | 0.27 | — | 0.5% | 0.001 | 17.1 | 3,400 |
| 47 | 0.46 | — | — | — | 0.16 | 0.38 | — | 0.5% | 0.001 | 33.7 | 2,700 |
| 48 | 0.49 | — | — | — | 0.21 | 0.30 | — | 0.5% | 0.001 | 25.0 | 4,300 |
| 49 | 0.51 | — | — | — | 0.18 | — | 0.31 | 30% | >0.05 | 27.2 | 2,300 |
| 50 | 0.49 | — | — | — | 0.17 | — | 0.34 | — | <0.00025 | Poor Sinter | |
| 51 | 0.54 | — | — | — | 0.13 | — | 0.33 | 0.5% | 0.001 | 23.4 | 3,100 |
| 52 | 0.53 | — | — | — | 0.20 | — | 0.27 | 0.5% | 0.001 | 21.4 | 3,300 |
| 53 | 0.46 | — | — | — | 0.16 | — | 0.38 | 0.5% | 0.001 | 39.8 | 2,200 |
| 54 | 0.49 | — | — | — | 0.21 | — | 0.30 | 0.5% | 0.001 | 29.8 | 2,700 |

As can be seen from Table 1, Table 2 and Table 3, the dielectric ceramics of Examples of this invention are superior in both the specific dielectric constant ($\epsilon_r$) and unloaded Q ($Q_u$).

In contrast therewith, the dielectric ceramics of Comparative Examples have a lower unloaded Q and mechanical strength than the ceramics of Examples. In particular, both the specific dielectric constant and unloaded Q are low in Comparative Example 4, which is a ceramic containing no fluorine.

We claim:

1. A dielectric ceramic having the composition represented by the general formula (I):

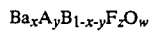

$$Ba_xA_yB_{1-x-y}F_zO_w$$

wherein A is at least one selected from the group consisting of Mg, Zn, Ni and Co; B is at least one selected from Ta and Nb; x, y, and z are numbers represented by $0.48 \leq x \leq 0.52$, $0.15 \leq y \leq 0.19$ and $0.00025 \leq z \leq 0.05$, respectively; and w is a number such that the total electric charges of cations of A and B and anions of F are neutralized to make the ceramic substantially neutral as a whole.

2. The dielectric ceramic according to claim 1, wherein the A in said general formula (I) consists of at least one selected from the group consisting of Mg and Zn and at least one selected from the group consisting of Ni and Co, each of said Ni and Co being present in a proportion of not more than 40 mol % in the A.

3. The dielectric ceramic according to claim 2, wherein Ni and Co in total are present in a proportion of not more than 40% in the A.

4. The dielectric ceramic according to claim 1, wherein the A in said general formula (I) consists of Mg and at least one selected from the group consisting of Ni and Co, said Ni and Co in total being present in a proportion of not more than 40 mol % in the A.

5. The dielectric ceramic according to claim 1, wherein the A in said general formula (I) consists of Zn and at least one selected from the group consisting of Ni and Co, said Ni and Co in total being present in a proportion of not more than 70 mol % in the A.

6. The dielectric ceramic according to claim 1, wherein the A in said general formula (I) is one selected from Mg, Zn, Ni, or Co, and the B in said general formula (I) is one selected from Ta or Nb.

7. The dielectric ceramic according to claim 1, wherein the A in said general formula (I) is Mg, and the B in said general formula (I) is Ta.

8. The dielectric ceramic according to claim 1, wherein the A in said general formula (I) is Zn, and the B consists of Ta and Nb.

9. The dielectric ceramic according to claim 1, wherein x, y and z in said general formula (I) are numbers in a range of $0.49 \leq x \leq 0.51$, $0.15 \leq y \leq 0.18$ and $0.0005 \leq z \leq 0.01$, respectively.

* * * * *